United States Patent
Winemiller et al.

(10) Patent No.: US 11,036,497 B1
(45) Date of Patent: Jun. 15, 2021

(54) CODE ASSESSMENT FOR QUALITY CONTROL OF AN OBJECT RELATIONAL MAPPER AND CORRECTION OF PROBLEMATIC CAST FUNCTIONS

(71) Applicant: CERNER INNOVATION, INC., Kansas City, KS (US)

(72) Inventors: Eric Christopher Winemiller, Spring City, PA (US); Ian Anderson, Elverson, PA (US); Nathan Krick, West Chester, PA (US); Sanjeev Janardan Nair, Bengaluru (IN)

(73) Assignee: CERNER INNOVATION, INC., Kansas City, KS (US)

( * ) Notice: Subject to any disclaimer, the term of this patent is extended or adjusted under 35 U.S.C. 154(b) by 0 days.

(21) Appl. No.: 16/654,206

(22) Filed: Oct. 16, 2019

Related U.S. Application Data

(60) Provisional application No. 62/749,943, filed on Oct. 24, 2018.

(51) Int. Cl.
  *G06F 9/44* (2018.01)
  *G06F 8/73* (2018.01)
  *G06F 8/41* (2018.01)

(52) U.S. Cl.
  CPC ............... *G06F 8/73* (2013.01); *G06F 8/427* (2013.01)

(58) Field of Classification Search
  None
  See application file for complete search history.

(56) References Cited

U.S. PATENT DOCUMENTS

| | | | |
|---|---|---|---|
| 7,680,767 B2 | 3/2010 | Adya et al. | |
| 8,286,149 B2 | 10/2012 | Dor et al. | |
| 8,443,342 B2 | 5/2013 | Rohde et al. | |
| 8,601,016 B2 | 12/2013 | Briggs et al. | |
| 8,726,254 B2 | 5/2014 | Rohde et al. | |
| 8,745,578 B2 | 6/2014 | Pistoia et al. | |
| 8,935,680 B2 | 1/2015 | Guamieri et al. | |
| 8,984,485 B2 | 3/2015 | Elshishiny et al. | |
| 10,606,825 B1* | 3/2020 | Sosonkin | G06F 16/248 |
| 2005/0060307 A1* | 3/2005 | Tran | G06F 16/283 |
| 2006/0242173 A1* | 10/2006 | Tsyganskiy | G06F 8/72 |
| 2006/0271341 A1* | 11/2006 | Brown | G06F 8/20 703/1 |
| 2008/0168432 A1* | 7/2008 | Ayachitula | G06F 8/4434 717/158 |
| 2008/0276223 A1* | 11/2008 | Morgan | G06F 8/51 717/125 |

(Continued)

*Primary Examiner* — Insun Kang
(74) *Attorney, Agent, or Firm* — Shook, Hardy & Bacon L.L.P.

(57) ABSTRACT

Embodiments herein disclose systems, methods, and computer-readable media for quality control of an object relational mapping (ORM) application and correction of problematic cast functions in the context of a relational database management systems. In embodiments, source code is parsed and portions of source code are identified when those portions of source code include a problematic casting between data types or a mapping between a field and a source table. In embodiments, the source code portions are marked or flagged and a report is generated. The report identifies the marked or flagged source code and further specifies the location of the marked or flagged source code, in embodiments.

20 Claims, 9 Drawing Sheets

(56) References Cited

U.S. PATENT DOCUMENTS

| | | | | |
|---|---|---|---|---|
| 2008/0301657 | A1* | 12/2008 | Bowler | G06F 8/443 |
| | | | | 717/158 |
| 2008/0313609 | A1* | 12/2008 | Meijer | G06F 8/437 |
| | | | | 717/114 |
| 2009/0037873 | A1* | 2/2009 | Ahadian | G06F 8/33 |
| | | | | 717/105 |
| 2009/0089743 | A1* | 4/2009 | Barsness | G06F 16/2358 |
| | | | | 717/106 |
| 2010/0325620 | A1* | 12/2010 | Rohde | G06F 9/44589 |
| | | | | 717/154 |
| 2012/0317134 | A1* | 12/2012 | Bourbonnais | G06F 16/2365 |
| | | | | 707/769 |
| 2015/0033202 | A1* | 1/2015 | Wilson | G06F 8/43 |
| | | | | 717/106 |
| 2016/0210129 | A1* | 7/2016 | Verlaguet | G06F 8/51 |
| 2016/0299758 | A1* | 10/2016 | Greer | G06F 8/73 |
| 2016/0350086 | A1* | 12/2016 | Horie | G06F 8/42 |
| 2017/0315903 | A1* | 11/2017 | David | G06F 8/73 |
| 2018/0349113 | A1* | 12/2018 | Boo | G06F 8/40 |
| 2019/0114165 | A1* | 4/2019 | Ghiondea | G06F 8/65 |
| 2020/0265041 | A1* | 8/2020 | Qiu | G06Q 20/0658 |

\* cited by examiner

```
, ('char', 'nchar')
, ('char', 'nvarchar')
, ('char', 'uniqueidentifier')
, ('char', 'bit')
, ('char', 'tinyint')
, ('char', 'smallint')
, ('char', 'int')
, ('char', 'bigint')
, ('char', 'smallmoney')
, ('char', 'money')
, ('char', 'decimal')
, ('char', 'numeric')
, ('char', 'real')
, ('char', 'float')
, ('char', 'time')
, ('char', 'date')
, ('char', 'smalldatetime')
, ('char', 'datetime')
, ('char', 'datetime2')
, ('char', 'datetimeoffset')
```

```
, ('nchar', 'uniqueidentifier')
, ('nchar', 'bit')
, ('nchar', 'tinyint')
, ('nchar', 'smallint')
, ('nchar', 'int')
, ('nchar', 'bigint')
, ('nchar', 'smallmoney')
, ('nchar', 'money')
, ('nchar', 'decimal')
, ('nchar', 'numeric')
, ('nchar', 'real')
, ('nchar', 'float')
, ('nchar', 'time')
, ('nchar', 'date')
, ('nchar', 'smalldatetime')
, ('nchar', 'datetime')
, ('nchar', 'datetime2')
, ('nchar', 'datetimeoffset')
```

```
, ('varchar', 'nchar')
, ('varchar', 'nvarchar')
, ('varchar', 'uniqueidentifier')
, ('varchar', 'bit')
, ('varchar', 'tinyint')
, ('varchar', 'smallint')
, ('varchar', 'int')
, ('varchar', 'bigint')
, ('varchar', 'smallmoney')
, ('varchar', 'money')
, ('varchar', 'decimal')
, ('varchar', 'numeric')
, ('varchar', 'real')
, ('varchar', 'float')
, ('varchar', 'time')
, ('varchar', 'date')
, ('varchar', 'smalldatetime')
, ('varchar', 'datetime')
, ('varchar', 'datetime2')
, ('varchar', 'datetimeoffset')
```

```
, ('nvarchar', 'uniqueidentifier')
, ('nvarchar', 'bit')
, ('nvarchar', 'tinyint')
, ('nvarchar', 'smallint')
, ('nvarchar', 'int')
, ('nvarchar', 'bigint')
, ('nvarchar', 'smallmoney')
, ('nvarchar', 'money')
, ('nvarchar', 'decimal')
, ('nvarchar', 'numeric')
, ('nvarchar', 'real')
, ('nvarchar', 'float')
, ('nvarchar', 'time')
, ('nvarchar', 'date')
, ('nvarchar', 'smalldatetime')
, ('nvarchar', 'datetime')
, ('nvarchar', 'datetime2')
, ('nvarchar', 'datetimeoffset')
```

```
, ('bit', 'smalldatetime')
, ('bit', 'datetime')
```
```
, ('tinyint', 'smalldatetime')
, ('tinyint', 'datetime')
```
```
, ('smallint', 'smalldatetime')
, ('smallint', 'datetime')
```
```
, ('int', 'smalldatetime')
, ('int', 'datetime')
```
```
, ('bigint', 'smalldatetime')
, ('bigint', 'datetime')
```
```
, ('smallmoney', 'smalldatetime')
, ('smallmoney', 'datetime')
```
```
, ('money', 'smalldatetime')
, ('money', 'datetime')
```
```
, ('decimal', 'smalldatetime')
, ('decimal', 'datetime')
```
```
, ('numeric', 'smalldatetime')
, ('numeric', 'datetime')
```
```
, ('real', 'smalldatetime')
, ('real', 'datetime')
```
```
, ('float', 'smalldatetime')
, ('float', 'datetime')
```

```
DECLARE @taskCode nvarchar(100);
DECLARE @oldTaskCode nvarchar(100);
DECLARE @callbackOid nvarchar(20);

SELECT @callbackOid = CONVERT(nvarchar(20), @piCallbackDefinitionOid);
SET @taskCode = 'CB_OID_' + @callbackOid;
SET @oldTaskCode = 'CB_' + @psCallbackListAbbr;

IF ( dbo.TB_Fn_IsSecurityDefined(@taskCode) = 0 AND dbo.TB_Fn_IsSecurityDefined(@oldTaskCode) = 0)
BEGIN
    EXEC CB_CreateCallbackListSecurity @pvcTaskCode= @taskCode, @pvcTaskName=@psCallbackListAbbr;
END IF ( NOT EXISTS (SELECT 1 FROM HSTaskTemplate where TaskCode = @taskCode OR TaskCode = @oldTaskCode)) AND @iResult = 0
BEGIN
    SET @iResult = @CallbackSecTaskNotFound;
END
```

FIG. 3

Summary

| Errors | Warnings | Performance |
|---|---|---|
| 737 | 744 | 258 |

Errors

| Stored Proc | Level | Message |
|---|---|---|
| CB_CreateCallbackListSecurity | error | Missing dbo. on stored procedure name (e.g. ALTER PROCEDURE dbo.CB_CreateCallbackListSecurity...) |
| CB_FetchCallbackList | error | Missing dbo. on stored procedure name (e.g. ALTER PROCEDURE dbo.CB_FetchCallbackList...) |
| CB_FetchCallbackList | error | Missing set nocount on for stored procedure (e.g. ALTER PROCEDURE dbo.CB_FetchCallbackList (...) AS BEGIN SET NOCOUNT ON; ...) |
| CB_FetchCallbackList | error | Unused parameter @piTrackingBoardId |
| CB_FetchCallbackList | warning | Return recordset without order by at SELECT CallbackDefinitionOid , CallbackListName , CallbackListAbbr , CallbackListType FROM @tblCallb... |
| CB_FetchCallbackList | error | Select * ( * ) at select * from @tblAssignedCallbackLists order by SeqNo... |
| CB_FetchCallbackListsForDetails | warning | Return recordset without order by at SELECT CallbackListDefOid , CBLIsEnded , CallbackListType FROM HCallbackListDef WHERE CallbackListAb... |
| CB_FetchCallbackListsForDetails | warning | Return recordset without order by at SELECT cbm.Context_OID CallbackMappedTrackingBoards FROM HCallbackListDef cbid LEFT OUTER JOIN HCall... |
| CB_FetchCallbackListsForDetails | warning | Return recordset without order by at SELECT tbv.TrackingBoardOid PatientTb , tbv.TBVisitIsDeleted , tbv.TBVisitIsRemoved... |
| CB_FetchCallbackListsForDetails | warning | Return recordset without order by at SELECT LoginID FROM HSUser WHERE ObjectID = @piUserOid AND isDeleted = 0... |
| CB_FetchCallbackListsAssignedToTB | error | Missing dbo. on stored procedure nam (e.g. ALTER PROCEDURE dbo.CB_FetchCallbackListsAssignedToTB...) |
| CB_FetchCallbackListsForConfig | warning | Suspected missing HFlowSheet.IsDeleted check at SELECT CallbackListDefOid , ResultFlowsheetOid , f.FlowSheetName , f.ValidityStatus , dbo.CB_Fn_Conv... |
| CB_FetchCallbackListsForConfig | warning | Return recordset without order by at SELECT CallbackListDefOid , ResultFlowsheetOid , f.FlowSheetName , f.ValidityStatus , dbo.CB_Fn_Conv... |
| CB_FetchCallbackListsForConfig | warning | Suspected missing HDataDictionaryItem.IsDeleted check at SELECT cdd.CallbackListDefOid , DispositionDDIOid , hdd.Name FROM HCallbackDefDisposition cdd INNER ... |
| CB_FetchCallbackListsForView | warning | Return recordset without order by at SELECT cdd.CallbackListDefOid , DispositionDDIOid , hdd.Name FROM HCallbackDefDisposition cdd INNER ... |
| CB_FetchCallbackListsForView | performance | Only one insert to @CallbackList; minimally logged select into temp table may perform better |
| CB_FetchCallbackListsForView | performance | Only one insert to @MyItemsSelectedTrackingBoards; minimally logged select into temp table may perform better |
| CB_FetchCallbacksToRemove | error | Missing dbo. on stored procedure name (e.g. ALTER PROCEDURE dbo.CB_FetchCallbacksToRemove...) |
| CB_FetchCallbacksToRemove | performance | Only one insert to @tblCallbackListPref; minimally logged select into temp table may perform better |
| CB_FetchCallbacksToRemove | warning | Suspected missing HTBVisit.TBVisitIsDeleted check at SELECT cb.CallbackOid , cb.CallbackListDefOid AS CallbackListDefOid , cb.CallbackListDefOid , hpv.Patient_oid... |
| CB_SaveCreateCallbackList | error | Unused declare @iNewCallbackListDefOid |
| CB_SaveCreateCallbackList | warning | Suspected missing HSTaskTemplate.IsDeleted check at SELECT 1 FROM HSTaskTemplate where TaskCode = @taskCode OR TaskCode = @oidTaskCode ... |
| CB_SaveCreateCallbackList | performance | Implicit type conversion varchar to nvarchar at TaskCode = @taskCode OR TaskCode = @oidTaskCode ... |
| CB_SaveCreateCallbackList | performance | Implicit type conversion varchar to nvarchar at TaskCode = @taskCode OR TaskCode = @oidTaskCode ... |
| CB_SaveCreateCallbackList | error | Select * ( * ) at SELECT * FROM DBA_SplitStringsByDelimeter ( @pvcNewDispositionDDIList , " ) ... |

```
define load_hint for
hfc.HSUser{LoginID;UUID;UserName;UserDescription;UserComment;Us
erType;EmergencyAccess;UserContact;LastLogonTime;BeginTime;EndT
ime;Person_oid;PreferenceGroup_oid;SignLevel;IssuedAliases.Begi
nTime;IssuedAliases.EndTime;IssuedAliases.recipient_oid;IssuedA
liases.donor_oid;IssuedAliases.AliasDescription;IssuedAliases.A
liasType;IssuedAliases.AliasState;IssuedAliases.recipient.UserN
ame;IssuedAliases.recipient.Person_oid;IssuedAliases.recipient.
UserType;ReceivedAliases.BeginTime;ReceivedAliases.EndTime;Rece
ivedAliases.recipient_oid;ReceivedAliases.donor_oid;ReceivedAli
ases.AliasDescription;ReceivedAliases.AliasType;ReceivedAliases
.AliasState; with ULinks( with Group(OwnGroup;);); with
Password(Password;OldPasswords;Provisional;EncryptionVer;LastCh
ange;ValidLength;); with CovGroups(CovGroup_oid;User_oid;);};}
```

FIG. 6

```
SELECT  t1.ObjectID ,
        t1.InstanceHFCID,
        t1.RecordID,
        t1.LoginID,
        t1.UUID,
        t1.UserName,
        t1.UserDescription,
        t1.UserComment,
        t1.UserType,
        t1.EmergencyAccess,
        t1.UserContact,
        t1.LastLogonTime,
        t1.BeginTime,
        t1.EndTime,
        t1.Person_oid,
        t1.PreferenceGroup_oid,
        t1.SignLevel,
        t2.ObjectID ,
        t2.InstanceHFCID,
        t2.RecordID,
        t2.BeginTime,
        t2.EndTime,
        t2.recipient_oid,
        t2.donor_oid,
        t2.AliasDescription,
        t2.AliasType,
        t2.AliasState,
        t3.ObjectID ,
        t3.InstanceHFCID,
        t3.RecordID,
        t3.UserName,
        t3.Person_oid,
        t3.UserType,
        t4.ObjectID ,
        t4.InstanceHFCID,
        t4.RecordID,
        t4.BeginTime,
        t4.EndTime,
        t4.recipient_oid,
        t4.donor_oid,
        t4.AliasDescription,
        t4.AliasType,
        t4.AliasState,
        t5.ObjectID ,
        t5.InstanceHFCID,
        t5.RecordID,
        t6.ObjectID ,
        t6.InstanceHFCID,
        t6.RecordID,
        t6.OwnGroup,
        t7.ObjectID,
        t7.InstanceHFCID,
        t7.RecordID,
        t7.Password,
        t7.OldPasswords,
        t7.Provisional,
        t7.EncryptionVer,
        t7.LastChange,
        t7.ValidLength,
        t8.ObjectID,
        t8.InstanceHFCID,
        t8.RecordID,
        t8.User_oid,
        t8.CovGroup_oid
FROM HSUser  t1
INNER JOIN HAlias  t2
    ON t1.ObjectID = t2.donor_oid AND t2.IsDeleted = 0
INNER JOIN HSUser  t3
    ON t2.recipient_oid = t3.ObjectID AND t3.IsDeleted = 0
INNER JOIN HAlias  t4
    ON t1.ObjectID = t4.recipient_oid AND t4.IsDeleted = 0
LEFT OUTER JOIN HSU2UGlink  t5
LEFT OUTER JOIN HSUserGroup  t6
    ON t5.Group_oid = t6.ObjectID AND t6.IsDeleted = 0
    ON t1.ObjectID = t5.User_oid
LEFT OUTER JOIN HSPassword  t7
    ON t1.Password_oid = t7.ObjectID AND t7.IsDeleted = 0
LEFT OUTER JOIN HSCovGroupMember  t8
    ON t1.ObjectID = t8.User_oid AND t8.IsDeleted = 0
WHERE t1.IsDeleted = 0
AND ( t1.ObjectID = @ObjectID )
```

FIG. 7

CODE ASSESSMENT FOR QUALITY CONTROL OF AN OBJECT RELATIONAL MAPPER AND CORRECTION OF PROBLEMATIC CAST FUNCTIONS

CROSS REFERENCE TO RELATED APPLICATIONS

This application is a non-provisional application that claims the benefit of priority from the provisional U.S. App. No. 62/749,943, filed on 24 Oct. 2018, and entitled "Code Assessment for Quality Control of an Object Relational Mapper and Correction of Problematic Cast Functions," the entirety of which is incorporated herein by reference.

BACKGROUND

Relational database management systems comprise hardware and software, such as computer applications that provide an interface between external computer systems and a database having storage memory.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description and Drawings.

In brief and at a high level, embodiments of the present invention provide systems, methods, and computer-readable media for quality control of an object relational mapper (ORM) and correction of problematic casting operations. Embodiments provide a customized and complex software product specifically created to address technological problems arising from the execution of source code by a server, where the source specifies (or is predicted to trigger) a problematic casting operation between data types, and/or specifies an improper table as a source for a field query due to a misalignment between an object-oriented string and tables in a database. Embodiments herein read the source code without execution, recognize the source code that is predicted to cause the technological problems above, and report the source code at issue for correction.

One embodiment provides one or more non-transitory computer-readable media having computer-executable instructions embodied thereon that, when executed, perform a method. The method comprises parsing source code stored in a database, the database comprising tables. In an embodiment, the method comprises identifying a portion of the parsed source code for requesting return of a record from the tables that is predicted to cast data stored in the tables as a first data type to a second data type, the first data type and the second data type being different. The method further comprises determining that to cast the data stored in the tables as the first data type to the second data type is a problematic casting operation, in an embodiment. In embodiments, the method comprises flagging the portion of the parsed source code determined to have a problematic casting operation. The method generates a report that identifies the flagged portion of the source code and a location of the flagged portion of the source code, in an embodiment.

Another embodiment provides one or more non-transitory computer-readable media having computer-executable instructions embodied thereon that, when executed, perform a method. In accordance with the media, the method comprises referencing source code stored in a database. In embodiments, the source code comprises objects, an object relational mapper (ORM) comprising mapping strings, and tables, each table having a field. The mapping strings and the tables are encoded in different programming languages, in some embodiments. The method parses each of the mapping strings in order to identify one or more of the objects and one or more of the fields within each mapping string. For each one of the parsed mapping strings, the method comprises identifying that the parsed mapping string maps the one or more of the objects to the one or more of the fields in the tables, parsing one or more of the tables having the one or more of the fields identified in the parsed mapping string, and using the parsed mapping string to determine whether the one or more parsed tables is a correct source for the one or more of the fields identified in the parsed mapping string. Then, when one or more of the parsed tables are determined to be incorrect sources for the one or more fields identified in the parsed mapping strings, the method generates a report that identifies the one or more parsed tables that are incorrect sources.

Yet another embodiment provides one or more non-transitory computer-readable media having computer-executable instructions embodied thereon that, when executed, perform a method. In accordance with the media, the method comprises parsing source code stored in a database, the source code comprising mapping strings and tables, the tables having fields. In an embodiment, the method identifies individual statements in the parsed source code. For each individual statement, the method identifies whether the individual statement comprises a mapping string of one or more objects and one or more fields. When the individual statement comprises the mapping string, the method continues by identifying that the mapping string maps the one or more objects to the one or more fields in the tables and parsing one or more of the tables having the one or more fields identified in the mapping string. The method then determines whether the one or more tables is a correct source for the one or more fields identified in the mapping string. The method flags the individual statement when it is determined that the one or more tables is not the correct source. The method further, in some embodiments, identifies whether an individual statement is predicted to request return of a record from one or more of the tables by casting the data stored in the tables from a first data type to a second data type that is different. When the individual statement is predicted to result in returning a record by casting the data, the method determines whether casting the data stored in the tables as the first data type to the second data type is a problematic casting operation and the method flags the individual statement when it is determined to have a problematic casting operation. The method then generates a report identifying each of the flagged individual statements.

BRIEF DESCRIPTION OF THE DRAWINGS

Embodiments are described in detail below with reference to the attached drawings figures, wherein:

FIG. 1 depicts examples of casting operations and a casting direction between data types, in accordance with embodiments;

FIG. 3 depicts an example of source code in accordance with an embodiment;

FIG. 5 depicts an example report generated for display via a graphical user interface (GUI) in accordance with an embodiment;

FIG. 6 depicts an example of a mapping string in accordance with an embodiment;

FIG. 7 depicts an example of a portion of source code in accordance with an embodiment;

DETAILED DESCRIPTION

Figure 2:
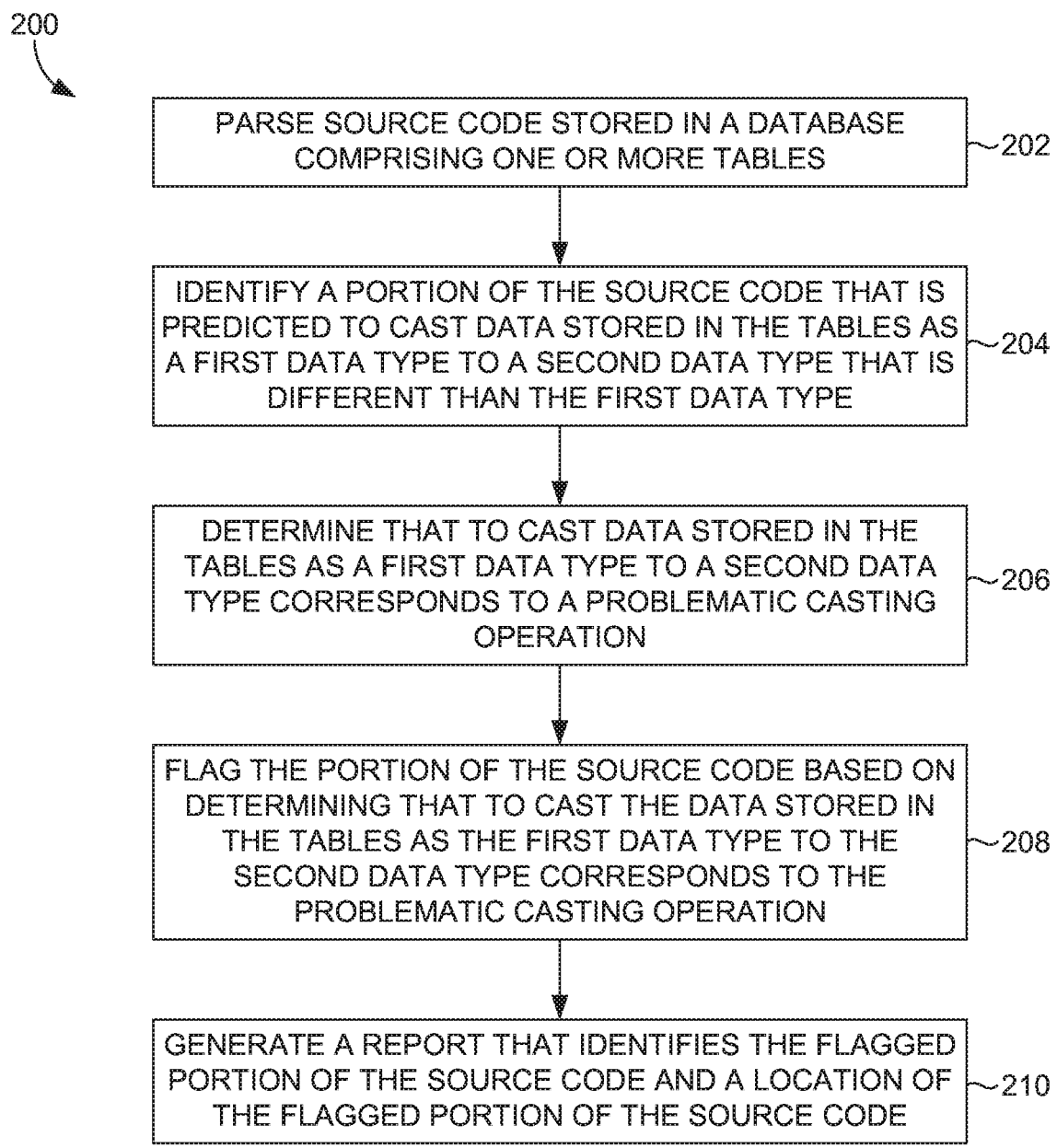
FIG. 2 depicts a flow diagram of a method in accordance with an embodiment.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, methods, and computer-readable media for quality control of an object relational mapper (ORM) and correction of problematic casting operations. As used herein, the term "problematic" refers to casting operations, whether express or inherent within source code, that are predicted to cause non-negligible lag-times for a server read, a run-time exception for a server performing a cast, other technological problems involving CPU resources, and/or the like, as discussed in detail hereinafter. At a high level, embodiments of the present invention provide a customized and complex software product that specifically addresses technological problems that result when source code, being executed by a server, specifies casting between data types that are predicted to be problematic and/or specifies a call to a database that is an improper source for a field query due to a misalignment between an object-oriented string and tables in a database. Embodiments herein read the source code without execution, recognize the source code that is predicted to cause the technological problems above, and report the source code at issue for correction. As used herein "source code," "program code," and "code" are used interchangeably. The systems, methods, and computer-readable media discussed herein may be implemented via a server. In some embodiments, the server is a Structured Query Language (SQL) server. SQL is a domain-specific computer language that is associated with a relational database management system (RDBMS). SQL (the language itself) generally comprises queries, statements, clauses, expressions, and predicates, for example.

In embodiments, a server interfaces with a database that stores data in one or more tables. In some embodiments, the database may be a SQL database. Each table comprises one or more columns and zero or more rows, in embodiments. Each column references a field, in embodiments. A row generally refers to a record (e.g., data), as stored under a column. Each record may comprise one or more attributes, in embodiments, and each attribute may be stored under a corresponding field within a table. For example, a table may include a first field for CustomerName and a second field for CustomerAddress. One record in the example table may include the attribute "John Doe" encoded in the SQL language under the first field CustomerName and may include the attribute "123 ABC Street" encoded in SQL under the second field CustomerAddress. In some embodiments, each table within the database and/or each field within a table may be assigned one or more properties. The one or more assigned properties may define and/or limit the one or more particular data types that may be stored within a particular table and/or within a field within the table. For example, a property may be assigned to the first field CustomerName to define that the first field may store data of the data type varchar.

Additionally, the database may store records (i.e., rows) within fields (i.e., columns) in order to form the table, wherein the table may be referred to as a database object. Further, one or more relationships existing between one or more tables may also be stored within the database. For example, the one or more relationships between tables within the database may be stored using Primary Key-Foreign Key constraints, wherein Primary Key-Foreign Key constraints may link one or more tables to one or more other tables (e.g., the key constraints represent the "relation" aspects of a RDBMS). Examples of relationships include a "1-1" relationship (i.e., one table to one table), a "1-M" relationship (i.e., one table to many tables), and an "M-M" relationship (i.e., many tables to many tables).

As used herein, "column" and "field" may be used interchangeably. Similarly, the terms "row" and "record" may be used interchangeably. Also, the terms "table" and "database object" are referenced interchangeably with regard to a SQL database. However, it will be noted that while a table is an instance of a database object, not all database objects are tables and there can more than one instance of a database object. Other exemplary database objects include indexes, sequences, views, and synonyms. Hereinafter, it will be understood by a person having ordinary skill in the art, in view of the this disclosure, that the terms and phrases "casting a table" and "casting an entire table" refers to casting one or more column(s) for every row in a table. Additionally, as used herein, "data type" and "type" are used interchangeably.

Casting

The server performs various operations and functions. As used herein, the terms "operation" and "function" are used interchangeably to refer to computer-executable instructions that are used to specify the performance of actions, tasks, queries, searches, record returns, and the like, for example, by a computing device, such as a server. Exemplary functions include "CAST ( )" also referred to herein as a casting function or "casting." The CAST( ) function is generally executed and thus performed by a server, such as a SQL server, in embodiments. In such embodiments, the server executes instructions that perform the casting function by converting an expression from one particular data type to another, different data type. Based on the casting function, the server may automatically perform the casting, wherein the casting enables the server to perform a comparison of the expression across two or more different types, and wherein the comparison enables the server to respond to another statement within the source code. For example, a statement may specify a query that automatically triggers casting, or a non-casting statement may trigger the server to perform casting across different data types when the non-casting statement may call for a result that may be produced by performing a comparison. As explained further below, casting operations may create problems, as found in other RDBMS and those problems are solved by the embodiments herein.

Generally, the written statement for a CAST( ) function reflects the following structure: CAST(expression AS data_type(length)). In the example statement, the terms "expression," "data_type," and "length" refer to parameter values. The parameter value expression may be a required parameter value for the CAST( ) function, in the example. The parameter value expression may be a value that, as specified by the instruction of the CAST( ) function, is directing the server to convert from one data type to another data type, for example. By converting the parameter value expression, the server may make a comparison as later discussed. The parameter value data_type may be a required parameter value for the CAST( ) function, in the example. In the example, the parameter value data_type specifies a particular data type to which the parameter value expression is to be converted through the casting, by the server. Examples of data types include char, varchar, nchar, nvarchar, bigint, int, smallint, tinyint, bit, decimal, numeric, money, smallmoney, float, real, datetime, smalldatetime, text, ntext, binary, varbinary, or image. In embodiments, the example data type char ("character") is a fixed-length, non-Unicode string-based data type. The example data type varchar ("character varying") is a variable-length, non-Unicode string-based data type, in some embodiments. The examples data type nchar ("national character") is a fixed-length, Unicode string-based data type, in embodiments. In some embodiments, the example data type nvarchar ("national character varying") is a variable-length, Unicode string-based data type. Generally, Unicode data may be stored using the Universal Multiple-Octet Coded Character Set (UCS-2) and/or 16-bit Unicode Transformation Format (UTF-16) storage. In contrast, non-Unicode data may generally be stored using 8-bit encoding, such as Extended American Standard Code for Information Interchange (ASCII), Double-byte Character Set (DBCS), or Extended Binary Coded Decimal Interchange Code (EBCDIC). Regarding the example data types and the CAST( ) function, the parameter value length is optional. The parameter value length may specify or define the character number (i.e., "length") of a data type that is desired to be returned by the server performing the CAST( ) function, in the example statement CAST(expression AS data_type(length)). Generally, the parameter value length may be applicable for casting when the parameter value data_type instructs or defines that the parameter value expression should be cast to char, varchar, nchar, nvarchar, binary, and/or varbinary data types. For example, casting expression 25.65 to the data type varchar may be represented as the statement: SELECT CAST(25.65 AS varchar).

Using a CAST( ) function in source code, a server may be instructed to perform a casting of the parameter value expression from one data type to another data type. For example, a server may be instructed to perform a casting of the parameter value expression from a fixed-length, non-Unicode string-based data type to a fixed-length, Unicode string-based data type. In another example, a server may be instructed to perform a casting of the parameter value expression from a variable-length, non-Unicode string-based data type to a variable-length, Unicode string-based data type. In yet another example, a server may be instructed to perform a casting of the parameter value expression from a variable-length, non-Unicode string-based data type to a fixed-length, non-Unicode string-based data type. In one example, a server may be instructed to perform a casting of the parameter value expression from a variable-length, Unicode string-based data type to a fixed-length, non-Unicode string-based data type. It will be understood that these are merely examples, and that any data types, and any combination of data type conversions, are contemplated to be within the scope of the invention.

In addition to the example statement, some statements within source code may cause the server to perform casting without expressly reciting the CAST( ) function. For example, casting may automatically result from source code that recites a WHERE clause, a JOIN clause, or a combination thereof, as discussed hereinafter.

Having discussed, at a high level, some aspects of the structure of a database, various data types for casting, express casting statements, inherent casting statements, and the casting function, embodiments herein address technological problems that specifically arise from casting operations that are specified in source code, when executed by a server. For example, when a casting operation is specified in source code or source code contains operations that are predicted to trigger a casting operation, when execute by a server, those portions of the source code may be predicted to cause the server to performing casting of a table in a database. In such an example, casting a table in a database may be technologically problematic, in particular, when the source code is predicted to cause the server to cast the entire table from one data type to another data type. This is a technological problem because the portion of the source code instructing the server to cast all of the records of all of the fields in the table results in a non-negligible "lag time" (e.g., approximately greater than or equal to 250 milliseconds) due to the read of all the records under all the fields within the table (e.g., a table that comprises approximately greater than or equal to 100,000 pages of records). In addition to the lag time of casting, a non-negligible amount of the processing resources of the server is being consumed on one casting operation, which is another technological detriment.

In one example illustrating the technological problem of non-negligible lag time, a server may begin casting from one data type to another data types in response to a query statement in the source code. The query may include a number having an integer data type, in the example. In formulating a response to the query of the example, the server may begin to read or scan a table that is associated with, or which stores data as, a varchar data type in an effort to locate records that are responsive to the query. However, the server may cast the table having the varchar data type over to the integer data type, rather than casting the number from the integer data type to the varchar data type and then referencing an index. The varchar to integer casting may be predicted to inefficiently utilize significant CPU resources and may be predicted to produce a non-negligible lag time due to a size (e.g., a number of rows and columns) of the table. Embodiments discussed herein solve the technological lag-time problem experienced in other RDBMS.

Additionally, the direction of the casting in the example may be predicted to result in an error. When casting from string-based data types (e.g., varchar) to integer-based data types (e.g., integer, bigint, tinyint), the server may locate a non-integer (e.g., alphanumeric) data type that is saved within a character string and that may not, should not, or cannot be accurately cast to integer-based data types. As such, the casting is predicted to cause a run-time exception for the server, in this example. In embodiments, a run-time exception may be predicted to result from source code when the source code instructs the performance of casting between different string-based data types (e.g., varchar data type cast to nchar data type). Generally, casting operations specify, identify, or include a direction for the data type to data type conversion. In embodiments, some data types may not, should not, or cannot be accurately or successfully cast to other data types, for example, without producing a run-time exception.

For example, some particular data types may not be accurately or successfully cast "up" to other particular data types, and some particular data types may not be accurately or successfully cast "down" to other particular data types. For example, nvarchar may not be accurately or successfully cast down to varchar. However, varchar may be cast up to nvarchar. The direction of casting nvarchar "down" to varchar, for example, is predicted to be technologically problematic because the nvarchar data type may encode more characters than the varchar data type, i.e., there may not be an equivalent character in varchar for the nvarchar character. Thus, in order to cast nvarchar to varchar, the varchar should instead be cast in the opposite direction ("up") to nvarchar instead. However, a server may lack directional casting intelligence and generally, the server performs casting in the direction specified in the source code. Embodiments discussed herein solve the technological run-time exception problem experienced in other RDBMS.

FIG. 1 provides a non-comprehensive list of examples of data type combinations that are predicted to produce a problematic casting operation. The direction of casting is provided in the example list of FIG. 1. In FIG. 1, the data type specified on the left is being cast to the data type specified on the right (e.g., char is being casted to nchar).

Accordingly, casting between different data types may be problematic when the direction of the casting is predicted to produce a run-time exception, and/or when the direction is predicted to omit the use of an index, which may result in a non-negligible lag time as the server casts all records and all fields within a table.

Embodiments herein address and provide a technological solution to the technological problems arising specifically from the technology (e.g., casting) itself, and thus, the embodiments improve the performance of an RDBMS. To illustrate the technological improvement, a server may encounter and attempt to execute a problematic casting operation in source code and, in the absence of the embodiments herein, may produce a lag time lasting 30 seconds or more and/or may produce a run-time exception. In contrast, through the embodiments herein, a problematic casting operation is recognized and corrected such that a sever executing the corrected problematic casting operation may exhibit a lag time of 30 milliseconds, for example. In another example, a server performing a problematic casting operation in source code, in the absence of embodiments herein, may attempt to read and cast a table of 250,000 records, producing a lengthy read time that uses significant CPU resources of the RDBMS. In contrast, through the embodiments herein, a server performing a corrected problematic casting operation avoids the same problem. Accordingly, embodiments herein address and solve technological problems arising specifically from the technology (e.g., casting) itself, and thus, the embodiments improve the performance of an RDBMS.

Beginning with FIG. 2, a flow diagram of an exemplary method 200 is shown in accordance with an embodiment of the present invention. The method 200 may be a computer-implemented method, in some embodiments. In one embodiment, one or more non-transitory computer-readable storage medium having computer-readable program code portions embodied therein are used to implement the method 200. For example, the computer-readable program code portions may include one or more executable portions configured to perform the method 200, in an embodiment. The computer-readable program code may correspond to a software application for performing the method 200, in some embodiments. Additionally, in embodiments, the method 200 provides a technological solution to the previously described technological problems.

In embodiments, the method 200 comprises parsing source code stored in a database comprising tables, as shown at block 202. Generally, in a SQL database, a table has one or more fields and zero or more records. In embodiments, each of the tables in the SQL database comprises at least one field. In some embodiments, at least one of the tables further comprises a record stored under at least one field. Additionally or alternatively, the SQL database may store a plurality of tables that are not duplicates of one another, though one or more of the tables may be duplicates, in some embodiments. In one embodiment, a plurality of non-duplicate tables comprise at least one field sharing the same identifier. As such, different tables may include fields bearing the same name, for example, such that field names are reusable within different tables in the SQL database.

At block 204, the method 200 comprises identifying a portion of the source code that is predicted to cast data stored in the tables as a first data type to a second data type that is different than the first data type, in some embodiments. In embodiments, the portion of the source code may comprise one or more clauses or statements that may expressly or implicitly cause a server to perform a casting operation. Generally, the second data type may be identified or defined in a field query, for example, to which a server may be responding when performing a cast. Accordingly, without requiring a server to execute the source code and attempt the cast, portions of the source code are recognized as containing or calling in a manner that is predicted to cause the server to perform a cast.

In embodiments, the first data type and the second data type are different data types. As such, the data of one data type that is stored in the table is to be cast to another data type in order for a server to make a comparison and identify records that are responsive to a query, for example. Generally, source code is predicted to cast data stored in a tables from one data type to another data type when the source code references a named field or a named parameter (e.g., @taskCode) that is defined with one data type using a DECLARE statement (e.g., DECLARE @taskCode nvarchar), but the data stored in a table to be queried in relationship to the field or parameter is stored using a different data type (e.g., varchar). In this example, the server is predicted to attempt to cast the data stored in the target table in one data type (e.g., varchar) over to the different data type (e.g., nvarchar) defined for the named parameter.

The casting problem may arise when the source code uses a WHERE clause or a JOIN clause, or both, for example. Generally, a WHERE clause may be used to instruct a server to extract records that meet a specified condition. The casting problem may arise in the presence of source code that comprises a WHERE clause and a comparison operator. Together, the WHERE clause and comparison operation are instructions that result in a comparison across different data types, wherein the direction of the casting performed to achieve the comparison may be predicted to be incompatible, as previously described. The casting problem may also arise in the source code comprising a JOIN clause, in embodiments. The JOIN clause, generally, may be used to instruct a server to combine rows from two or more tables having a related column. Because the JOIN clause is an instruction to compare a row in at least two tables, the casting may be incompatible when the two or more tables store records in different data types, as explained above. It will be understood, however, that only some casts raise concern.

In an embodiment, the method 200 determines that to cast the data stored in the tables as the first data type to the second data type is a problematic casting operation, shown at block 206. Generally, a "problematic" casting operation may be recognized in one or more portions of the source code by determining that casting the data stored in the tables as the first data type over to the second data type is predicted to result in a server casting all records under all fields, within one or more of the tables, to the second data type. For example, each of a SELECT, a DELETE, and/or an UPDATE clause may cause and/or trigger the server to cast in a particular direction when the server executes the source code in order to respond to the instruction of the clause, as the SELECT, DELETE, and UPDATE clauses rely on a comparison of information between tables. In some embodiments, the direction of the casting between data types may be such that the server may be prevented from utilizing an index, and/or that an index may not be available to the server (e.g., when the source code causes casting from nvarchar to varchar, only an index that supports varchar to nvarchar casts may be accessible or present in the RDMDS). When an index is unavailable due to the direction of the casting, for example, the server may attempt to read, scan, and cast all or nearly all of the records in the table. Specifically, a SELECT * clause may be predicted to be a problematic casting operation when the clause may produce errors based on positional logic. In one example, a SELECT * clause may be predicted to be a problematic casting operation because the "*" indicates a field query, where the field query specifies a return of records from all of the fields within a table. As the column order is not guaranteed to be consistent between two or more clients, the SELECT * clause, when executed, may return data that does not reflect the intended column position, as further discussed hereinafter.

When determining whether casting is predicted to be a problematic casting operation, the data types involved in the source code may be recognized using metadata that describes the table at issue, for example. Using the metadata that describes a table, the method 200 may recognize the schema of the table and/or the schema associated with each column in the table, in some embodiments. The schema may be used, for example, to identify the data type of the table and/or the columns in the table. For example, the method 200 may determine that the casting is a problematic conversion by recognizing that the portion of the parsed source code comprises a JOIN clause, a WHERE clause, or a combination thereof. Then, in the example, the method 200 may identify another table specified by the JOIN clause, the WHERE clause, or the combination thereof. By identifying metadata associated with the other table (e.g., a table identified by the JOIN clause), recognizing that the metadata describes a schema of the other table and that the schema identifies the second data type, the method 200 may identify that the other table is associated with the second data type based on the schema.

Accordingly, determining that casting the data stored in the tables as the first data type to the second data type is a problematic casting operation may comprise identifying metadata associated with the tables, wherein the metadata describes a schema of the tables and the schema identifies the first data type. In an embodiment, the method 200 identifies that the tables are the first data type based on the schema. In one embodiment, the method 200 recognizes that the portion of the parsed source code comprises a parameter, wherein the parameter is identified as the second data type. For example, a portion of source code defines a named parameter @taskCode as being nvarchar data type (e.g., the portion of source code includes DECLARE @taskCode nvarchar). However, that portion of source code may reference a field or a table that stores data as a varchar data type, for example. A server may, when executing the portion of source code, attempt to cast the data stored in the target table in one data type (e.g., varchar) over to the different data type (e.g., nvarchar) defined in the named parameter. However, because data of the nvarchar data type may not be accurately or successfully down cast to the varchar data type, the server may not have an index available for casting in that direction. As such, the server may read, scan, and attempt to cast all varchar records to nvarchar in order to make a comparison, as such a comparison may be called for in order to determine which of the one or more records are to be returned. In the example, the method 200 may determine that casting the data stored in the tables as a varchar data type to the nvarchar data type is predicted to be a problematic casting operation.

FIG. 3 provides an exemplary portion of source code that may be predicted to be a problematic casting operation, in embodiments. For example, the portion of source code may be determined to be predicted to trigger a problematic casting operation when the named parameter @taskCode in the SELECT clause is defined as nvarchar data type through the DECLARE statement, and when the FROM clause references a table HSTaskTemplate that stores data as varchar data type (e.g., SELECT 1 FROM HSTaskTemplate where TaskCode=@taskCode). The exemplary source code in FIG. 3 may be predicted to be a problematic casting operation due to the potential for inducing a resource-taxing cast (e.g., an "expensive" cast) between particular data types, in a specific direction, and/or due to the absence of a usable index.

Continuing, a problematic cast in the source code may be recognized by determining that the first data type of the table is a string-based data type and determining that the second data type, to which the data in the table is to be cast, is an integer-based data type. For example, data stored as a string-based data type may not be accurately or successfully cast to an integer-based data type because a server is predicted to truncate a record or "round" the data stored in the record when casting from a string-based data type (e.g., varchar) to an integer-based data type (e.g., smallint, integer, bigint, tinyint). The casting operation may be predicted to be problematic because integer-based data types may store values as a literal representation of a number's value whereas string-based data types may store values using a sequence of characters, either as a literal constant or a variable. Due to these differences in value representation, casting from a string-based data type to an integer-based data type is predicted to produce inaccuracies, and generally, the casting of a table may be predicted to fail and return an error. As such, source code that is predicted to trigger a cast from a string-based data type to an integer-based data type may be determined to be problematic, in accordance with the method 200. Additionally or alternatively, the method 200 may recognize that casting data stored in the tables from a string-based data type to an integer-based data type is predicted to reduce and/or impair the performance of the server when attempting to respond to executed source code by returning a record.

In some embodiments, source code that may produce casting between different string-based data types may be determined to be problematic when the casting is predicted to potentially negatively impact or otherwise impair performance of the server by leveraging a significant amount of processing resources when the server is attempting to return results, for example. Accordingly, some string-to-string data type casts may be predicted to be problematic when the directionality of the casting may result in the server reading, scanning, and casting all or nearly all the records within a table, as previously described.

In some embodiments, the method 200 may determine that the first data type is a first integer-based data type and that the second data type is a second integer-based data type. In one embodiment, the method 200 may determine that to cast the data from the first integer-based data type to the second integer-based data type is predicted to reduce performance of a server.

For example, a problematic casting operation in the source code may be recognized by determining that the first data type of the table is a first string-based data type and determining that the second data type, to which the data in the table is to be cast, is a second string-based data type. In this example, the method 200 recognizes that casting the data stored in the table(s) from the first string-based data type to the second string-based data type may be a problematic down cast, for example, that may potentially trigger the server to scan and cast an entire table. In another embodiment, a problematic conversion in the source code is recognized by determining that the first data type of the table is a first string-based data type and determining that the second data type, to which the tables are to be cast, is a second string-based data type. In this embodiment, the method 200 recognizes that casting the data stored in the table(s) from the first string-based data type to the second string-based data type may be a problematic up cast, for example, that may potentially trigger the server to scan and cast an entire table.

In another embodiment, source code may be determined to be problematic based on a prediction that the casting results from the source code is predicted to produce errors based on positional logic. For example, the method 200 may determine that the portion of the parsed source code comprises a SELECT * clause, and the SELECT * clause indicates a field query that specifies a return of all fields within a table. Further, the portion of the parsed source code may comprise a FROM clause, and the FROM clause may identify a table from which the fields are to be returned, for example. A problematic casting operation may be predicted when the order or position of columns relative to one another within the table differs between clients, as the order of the columns is determined when the table was created by the client. For example, a SELECT * FROM table statement may return results from the columns in an incorrect order. In other words, the SELECT * clause is an instruction to a server to return records for all of the fields within the table, and the column order within the table may be predicted to be objectid, description, isdeleted. However, the actual column order within the table may be objectid, isdeleted, description, for example. As such, the source code may be predicted to produce an error by returning values that have a different order, for example, when casting.

At block 208, the method 200 flags the portion of the source code based on determining that to cast the data stored in the tables as the first data type to the second data type corresponds to the problematic casting operation. The method 200 may flag, bookmark, or otherwise record a location of the portion of parsed source code that is determined to comprise a problematic conversion. In embodiments, the method 200 may generate a report that identifies the flagged portion of the source code and a location of the flagged portion of the source code, as shown at block 210. In some embodiments, the report includes a portion or a snippet of the flagged code itself. In one embodiment, the snippet includes the statement of the source code that was flagged and one or more additional characters (e.g., 10-50 characters) of the source code located immediately before and/or immediately after the statement (i.e., flanking the flagged source code). The report is configured for display to a user, for example, via a graphical user interface (GUI), in one embodiment. The report provides a list of source code locations and specifies whether each piece of source code is predicted to generate an error, a warning, and/or impaired server performance, in some embodiments.

In embodiments, the method 200 may be iteratively performed to parse all of the source code stored in the SQL database, and flag portions of the parsed source code determined to be associated with or comprise a problematic casting operation, wherein the report identifies the flagged portions of the source code and the locations of the flagged portions of the source code.

Additionally or alternatively, having parsed the source code, the method 200 may recognize end-of-line (EOL) markers in the source code and/or may recognize comments at the EOL markers. The comments recognized for corresponding to EOL markers may be used to suppress errors and/or suppress warnings in the report that is generated. Additionally or alternatively, in some embodiments, having parsed the source code, the portions of source code are flagged and included in the report when those portions of the source code that are predicted to result in an error, warning, and/or performance degradation.

Alignment

Additionally or alternatively, an RDBMS may comprise an Object Relational Mapping (ORM) application for performing interoperability-enabling conversions of another kind. Generally, an ORM application comprises one or more mapping strings that enable data conversion between two or more incompatible systems, thus creating new interoperability between differing technologies. The mapping strings of the ORM application may map one or more objects that are encoded in one computer language to one or more fields encoded in another computer language. For example, the mapping strings may map or define relationships between objects encoded in C++ to fields in tables encoded in SQL. The objects and fields are mapped to one another in order to define and indicate one or more relationships between an object and one or more fields, for example.

Generally, SQL-based RDBMS store and manipulate scalar values. In some embodiments, SQL-based RDBMS may be configured to store and manipulate scalar values (i.e., may not be configured to store and/or manipulate non-scalar values). An exemplary scalar value is an integer-based data type or a string-based data type. An example of a non-scalar value is a tuple. Accordingly, an ORM application may enable a server and a database in an RDBMS to interface with systems that use an object-oriented computer programming language and/or non-scalar values, in embodiments. Generally, object-oriented computer languages define classes and an object is an instance of a class. Examples of object-oriented computer languages are C++, C#™ Java™, Javascript™, Python™, Hypertext Preprocessor (PHP), Golang (GO), Ruby, and BASIC. In order for an object-oriented computer system to interface with and/or leverage the data stored in scalar form within a SQL database, an ORM application may be used by a server to facilitate the communications. Through the ORM application, a server is able to obtain and understand object-oriented language source code, and may relate the object(s) to the data stored in the database using a non-object-oriented language, such as SQL. Notably, the ORM application is complex and may correspond to custom-configured computer software.

As previously explained, different tables in a SQL database may include fields bearing the same identifier or "name." Thus, when one mapping string references more than one field associated with the same identifier or a similar identifier, each field may correspond to a different table. However, due to the multiple occurrences of fields bearing the same or similar identifier in the mapping string, a server using the mapping string may return records from tables that do not correspond to the desired fields of the mapping string (e.g., another table is erroneously referenced). To illustrate this technological problem, for example, one mapping string might relate an object Staff to both the table Patient and the table Staff, where that mapping string includes the field Description twice. During run-time, a record from the field Description in the table Patient may be erroneously returned instead of a record from the field Description in the table Staff when the ORM application is used by a server to return records for the Description fields in the mapping string. To further illustrate this technological problem, arising from a server using an ORM application to 'read' a non-SQL language and map non-SQL computer language to data stored in tables and encoded in SQL, consider the exemplary mapping string shown below: define load hint for hfc.Staff{Description;StaffID;PrescriberCode;Activation-Date;InactivationDate;Active;DateEnter edPractice;Name; StaffSignature;ExternalID;StaffType; with PrimarySpeciality(Name;Description;); with SecondarySpeciality(Name; Description;);};}

The exemplary mapping string is coded in a non-SQL language and the mapping string includes three instances of the field Description, and each Description field is associated with a different object. According to the mapping string, a record for the field Description is instructed to be returned for the object Staff (i.e., hfc.Staff{Description;StaffID;), the second instance of the field Description is instructed to return a record for PrimarySpeciality (i.e., PrimarySpeciality (Name;Description;)), and the third instance of the field Description is instructed to return a record for SecondarySpeciality (i.e., SecondarySpeciality(Name;Description;)). Further, the example mapping string relates the object Staff to the PrimarySpeciality (e.g., with PrimarySpeciality(Name;Description;)) and SecondarySpeciality. Due to multiple occurrences of Description fields all bearing the same identifier in the example mapping string, other RDBMS comprising a server may not accurately distinguish between the three instances of Description. When other RDBMS attempt to match the mapping string to tables in a database, records might be returned from tables having fields of a same or similar name, but those tables did not correspond to the fields of the desired tables set forth in the mapping string. For example, in other RDBMS, records under the field Description from a corresponding table for PrimarySpeciality or a corresponding table for SecondarySpeciality, in the database, might be improperly returned for the first instance of the field Description instead of returning a record under the field Description from the table corresponding to Staff in the database.

Embodiments of the present invention provide a quality control check of the ORM application in order to recognize and/or prevent erroneous conversion between an object-oriented computer system and a SQL-based RDBMS that leverages an ORM application. Accordingly, embodiments of the present invention ensure high-fidelity and proper alignment of mapping strings and SQL source code.

Figure 4:
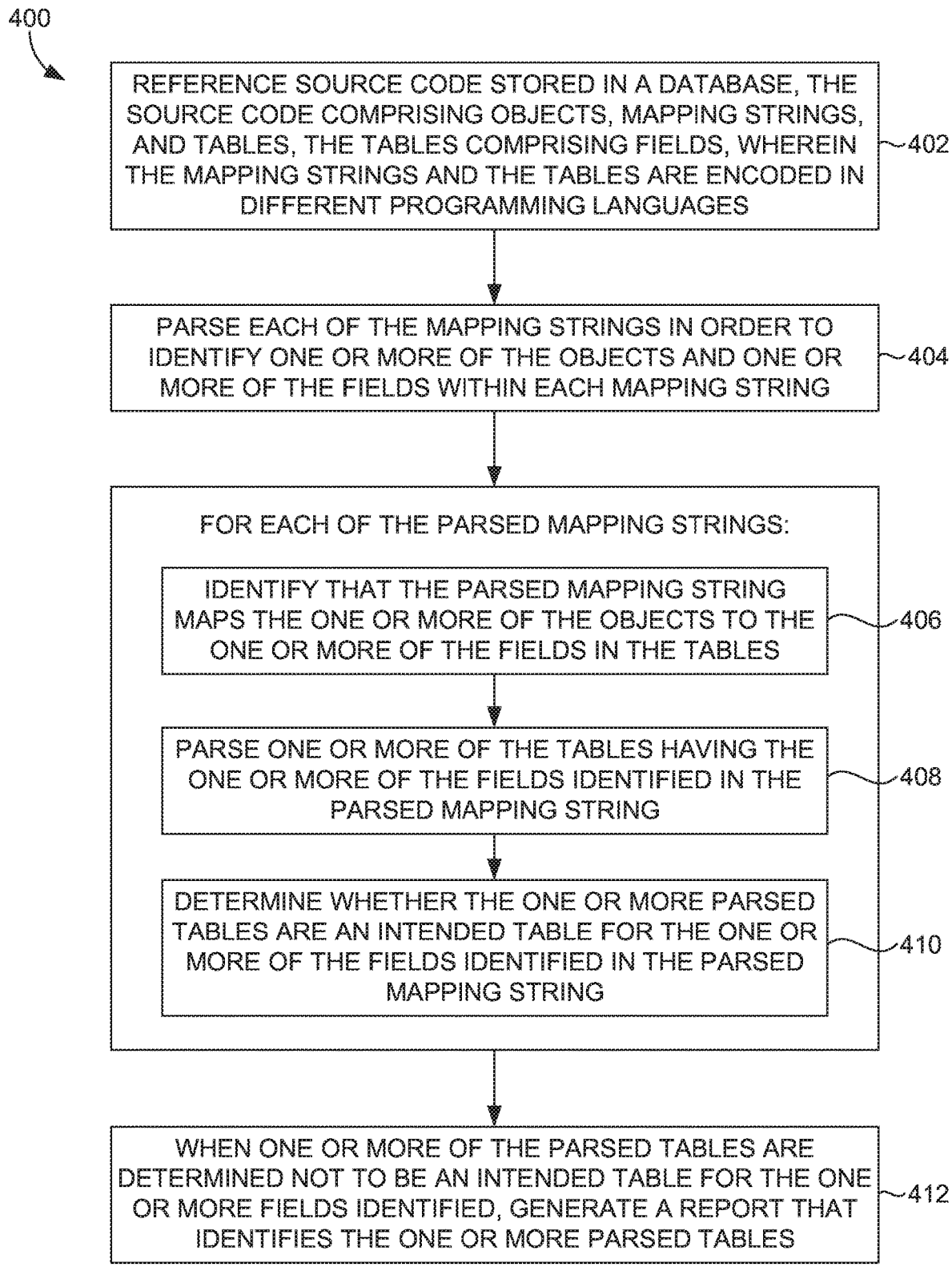
FIG. 4 depicts a flow diagram of another method in accordance with an embodiment.

Turning to FIG. 4, it provides a flow diagram of an exemplary method 400 in accordance with an embodiment of the present invention. In some embodiments, the method 400 is performed by execution of computer-executable instructions embodied on one or more non-transitory computer-readable media by one or more processors. The method 400 addresses and prevents the technological problems previously described. Accordingly, the method 400 provides a technological solution to those technological problems and improves an RDBMS by ensuring high-fidelity and proper alignment of mapping strings and SQL source code.

At block 402, the method 400 comprises referencing source code stored in a database, the source code comprising objects, mapping strings, and tables, the tables comprising fields. In embodiments, the mapping strings and the tables are encoded in different programming languages. For example, the mapping strings may be encoded in an object-oriented computer language and the tables may be encoded in a non-object-oriented computer language. In one example, the mapping strings may be encoded in the C++ language and the tables may be encoded in the SQL language. In some embodiments, the source code comprises an ORM application, wherein the ORM application comprises one or more of the mapping strings.

At block 404, the method 400 may parse each of the mapping strings in order to identify one or more of the objects and one or more of the fields within each of the mapping strings. The method 400, in some embodiments, identifies objects and/or fields within a mapping string automatically, concurrently, or subsequent to parsing the source code. In one embodiment, the source code may be scanned at a high granularity to particularly identify mapping strings (e.g., in contrast to a SQL table) based on their unique language structure and then the mapping strings may be subsequently parsed. In an embodiment, the parsed mapping string may be a comma delimited list that specifies one or more relationships between, for example, the one or more objects, the one or more fields, or the one or more of the objects and the one or more of the fields. In this way, the one or more relationships identified in the parsed mapping string may be used when determining whether the one or more parsed tables may be an intended target or source table, as discussed below, in embodiments.

Continuing, for each of the parsed mapping strings, the method 400 identifies that each parsed mapping string maps the one or more of the objects to the one or more of the fields in the tables, as shown at block 406. By parsing the mapping string and examining the structure of the mapping string, embodiments of the method 400 may identify and/or recognize objects, fields, relationships between objects and fields, and relationships between objects, as defined in the mapping string. For example, consider the example mapping string: defineloadhintforhfc.StaffDescription;StaffID;PrescriberCode;ActivationDate;InactivationDate;Active;DateEnteredPractice;Name;StaffSignature;ExternalID;StaffType; with PrimarySpeciality(Name;Description;); with SecondarySpeciality(Name;Description;);};}

In the example mapping string, the method 400 may recognize that the first instance of Description has a relation to the field Staff. The method may recognize that the second instance of Description has a relation to the field PrimarySpeciality, and that the third instance of Description has a relation to the field SecondarySpeciality. As such, the method 400 may identify and/or recognize objects, fields, relationships between objects and fields, and relationships between objects, as set forth in the example mapping string. Other RDBMS are unable to recognize relationships between objects and fields in mapping strings, and are unable to recognize relationships between objects in mapping strings.

At block 408, the method 400 may parse one or more of the tables that comprise one or more of the fields that are identified in the parsed mapping string. In embodiments, parsing the tables enables the method 400 to identify the fields within the tables, and to identify records that correspond to the fields within the tables. It should be noted that, although block 404 and 408 are shown separately, the source code stored in the database may be parsed as the source code is scanned or "read" line-by-line, as opposed to separately parsing the mapping strings and tables, in some embodiments. For example, mapping strings and tables may be parsed as each may be encountered line-by-line during examination of the source code.

The method 400 may determine whether the one or more parsed tables are the intended target table or intended source table for the one or more of the fields identified in the parsed mapping string, as shown at block 410. At a high level, the method 400 determines whether the mapping string in the ORM application may, when read by a server querying the records via the mapping string, pull records from the intended target or source table in the database. When determining whether a parsed table is the intended target or source table, the method 400 may determine whether an identifier of the one or more of the fields identified in the mapping string within the parsed mapping string matches an identifier of the field in the parsed table. For example, the method 400 may determine when an identifier of the one or more of the fields identified in the mapping string matches an identifier of at least one field in the one or more parsed tables. In another example, the method 400 may determine that an identifier of the one or more of the fields identified within the parsed mapping string does not match an identifier of the one or more of the fields in the parsed table.

The method 400 may determine whether a field mapped to an object in the mapping string aligns, by identifier (e.g., name), with a field in the parsed table. The method 400 may determine whether that field mapped to an object in the mapping string does not align, by identifier (e.g., name), with a field in the parsed table. As discussed above, different tables may comprise fields having the same identifier. Thus, using the identifier of a field alone may not accurately point to the intended target or source table, in some scenarios. Accordingly, the method 400 may determine a number of the one or more of the fields identified in the parsed mapping string, relative to a number of the one or more of the fields in the parsed table, in some embodiments. For example, when the mapping string specifies that one object Insurance maps to a first field Name and also maps to a second field Code, the method 400 determines whether the parsed table also contains at least two fields. Then, the method 400 may examine whether the parsed table having at least two fields includes a field identified as Name and a field identified as Code. For example, when the parsed table having at least two fields includes a field identified as Name but does not include a field identified as Code, the mapping string calls to the incorrect table. The method 400 may further comprise determining whether a particular table corresponds to the object Insurance. Accordingly, the method 400 is examining alignment of the mapping string and one or more tables and fields within the tables.

Additionally, in some embodiments, the method 400 may determine whether placement of the one or more of the fields within the parsed mapping string and the placement of the one or more of the fields in the parsed table that were determined to have matching identifiers is similar or the same within the first mapping string. For example, the method 400 may determine that the placement of the one or more of the fields within the parsed mapping string matches a placement of the one or more of the fields in the parsed table that are determined to have matching identifiers, wherein the one or more parsed tables are determined to be an intended table for the one or more of the fields identified in the parsed mapping string. In another example, the method 400 may determine that a placement of the one or more of the fields within the parsed mapping string does not match a placement of the one or more of the fields in the parsed table that are determined to have matching identifiers, wherein the one or more parsed tables are determined not to be an intended table for the one or more of the fields identified in the parsed mapping string.

Additionally or alternatively, in embodiments, the method 400 determines whether an identifier of the one or more of the fields within the parsed mapping string matches an identifier of the one or more of the fields in the parsed table, and also determines whether the placement of the one or more of the fields within the parsed mapping string is the same or similar as the placement of the one or more of the fields in the parsed table having matching identifiers within the first mapping string. When the identifiers match and the placement is the same, the method 400 may determine that the parsed table is the intended target or source table of the mapping string, in some embodiments. When the identifiers match and the placement is not the same or is not similar, for example, the method 400 may determine that the parsed table is not the intended target or source table of the mapping string, in embodiments.

Additionally or alternatively, the method 400 may determine a number of the one or more of the fields identified in the parsed mapping string relative to a number of the one or more of the fields in the parsed table, when determining whether a parsed table is the intended target or source table. For example, the method 400 may determine when a total number of the one or more of the fields identified in the parsed mapping string matches a total number of the one or more of the fields in the parsed table.

At block 412, the method 400 comprises generating a report that identifies the one or more parsed tables that are incorrect sources, for example, when one or more of the parsed tables are determined not to be the intended table for the one or more fields identified in the parsed mapping strings. Additionally or alternatively, the report may specify and confirm that the one or more of the parsed tables are the intended target(s) or source table(s), in some embodiments. The report may be configured for display to a user, for example, via a GUI. The report provides a list of source code locations and specifies whether each piece of source code is predicted to generate an error, a warning, and/or impaired server performance, in some embodiments.

To summarize, at a high level, based on parsing the source code, a portion of the source code is identified when that portion of source code specifies values in a SELECT clause that do not align with a load_hint definition. In such an embodiment, the portion of source code is flagged as containing a load_hint mismatch error. The flagged portion of the source code is included in the report that is generated. FIG. 5 depicts an example report 500 that identifies flagged portions or source code.

In some embodiments, the method 400 may be iteratively performed to parse the source code line-by-line. Additionally or alternatively, the method 400 may generate a report that identifies one or more tables that are determined not to be the intended target(s) or source table(s) of the mapping string, that identifies the mapping strings that incorrectly map to the one or more tables that are determined not to be intended target(s) or source table(s), and identifies the one or more fields within the mapping strings that incorrectly map to the one or more tables that are determined not to be the intended target(s) or source table(s).

As discussed above, embodiments herein may identify the relationships between objects, relationships between fields, and relationships between objects and fields within a mapping string, and may recognize the intended target or source table of the mapping string. These are new computerized functions, including the ability to recognize objects, fields, and integers that have been erroneously transposed within a mapping string, for example, via the methods discussed herein. For example, in the example mapping string 600 of FIG. 6, the last line specifies User_oid and CovGroup_oid, as having a relationship to CovGroups. The example mapping string 600 may be parsed and may be aligned with the example source code 700 shown in FIG. 7, using the methods discussed herein. Based on determining whether there is or is not an alignment, embodiments herein may recognize that the mapping string 600 recites CovGroups (User_oid;CovGroup_oid;) and further, that the mapping string 600 includes transposed field queries, based on the example source code 700 (i.e., non-alignment between the example mapping string 600 and the example source code 700 indicates a predicted transposition of the field queries in the mapping string 600). As such, embodiments herein recognize erroneously transposed field queries in mapping strings. In this example, the define load_hint code shown in FIG. 6 does not align with the source code 700 shown in FIG. 7. Specifically, the load_hint in the mapping string 600 recites CovGroups(User_oid;CovGroup_oid;) while the source code 700 recites CovGroups(CovGroup_oid; User_oid;). The mapping string 600 and source code 700 are shown with modifications (bold text) to illustrate the non-alignment or misalignment that indicates the transposed field query in the mapping string 600.

Additionally, based on alignment determinations, embodiments may recognize when a mapping string aligns with SQL code, such that alignment is validated and, for example, field queries are not incorrect or transposed.

Figure 8:
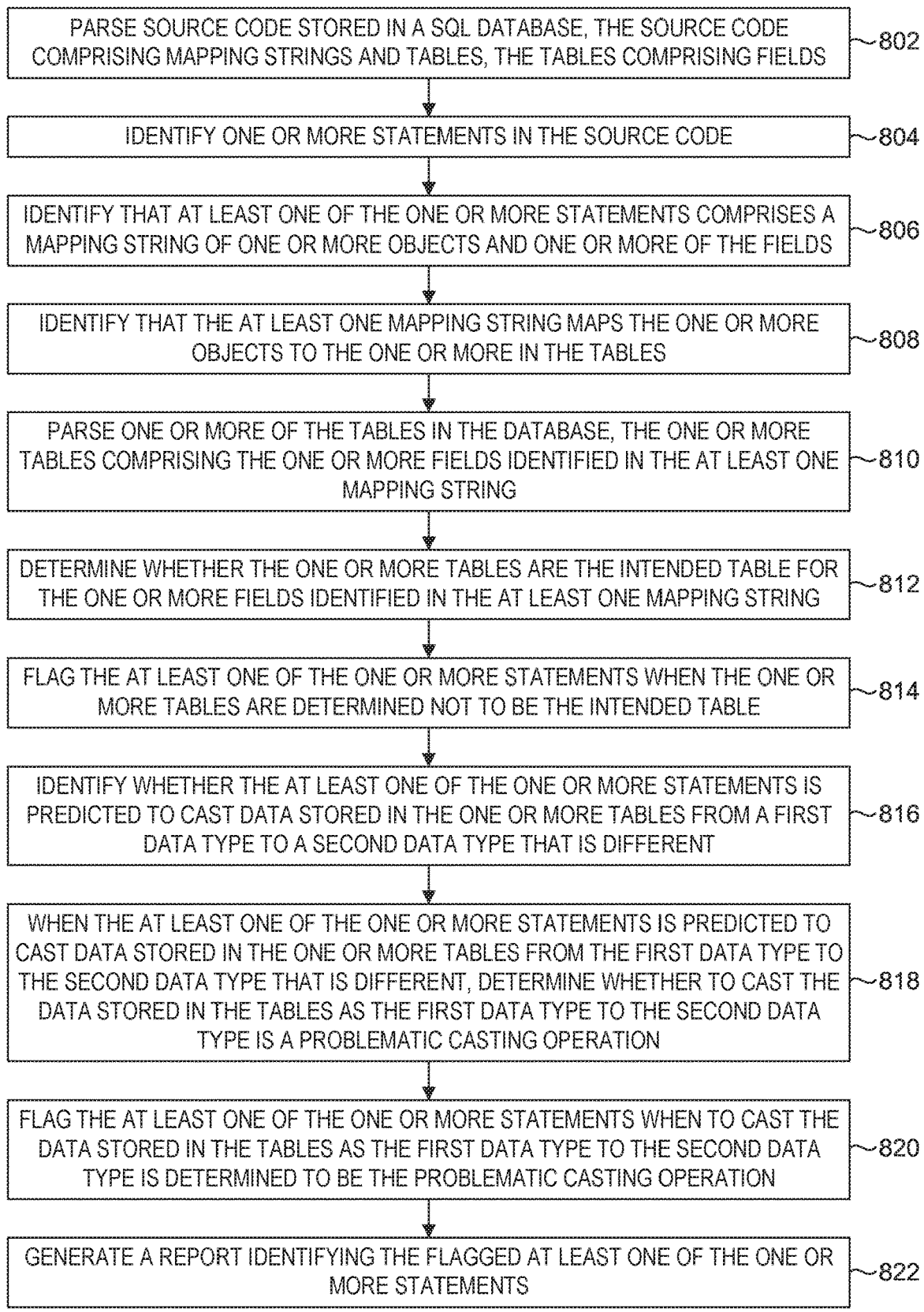
FIG. 8 depicts a flow diagram of another method in accordance with an embodiment.

Finally, embodiments may perform multiple methods, such as method 200 and method 400. For example, FIG. 8 provides a method 800 in accordance with the embodiments. The method 800 is discussed briefly for brevity, though it will be understood that the previous discussion and details described herein may be applicable to aspects of the method 800. The method 800 comprises parsing source code stored in a SQL database, the source code comprising mapping strings and tables, shown at block 802. The tables comprise fields and the mapping strings comprise objects, generally. The method 800 may identify one or more statements in the source code, shown at block 804. In some embodiments, the method may identify that at least one of the one or more statements comprises a mapping string of one or more objects and one or more of the fields, shown at block 806.

At block 808, the method may identify that the at least one mapping string maps the one or more objects to the one or more fields in the tables. At block 810, the method 800 may parse one or more of the tables in the database, wherein the one or more tables comprise the one or more fields identified in the at least one mapping string. The method 800 determines whether the one or more tables are the intended table for the one or more fields identified in the at least one mapping string, in embodiments, as shown at block 812.

The method 800 may then flag the at least one of the one or more statements when the one or more tables are determined not to be the intended table, shown at block 814.

At block 816, the method 800 may identify whether the at least one of the one or more statements is predicted to cast data stored in the one or more tables from a first data type to a second data type that is different. When the at least one of the one or more statements is predicted to cast data stored in the one or more tables from the first data type to the second data type that is different, the method 800 may determine whether to cast the data stored in the tables as the first data type to the second data type is a problematic casting operation, as shown at block 818. The method 800 may further flag the at least one of the one or more statements when to cast the data stored in the tables as the first data type to the second data type is determined to be the problematic casting operation, as shown at block 820. Finally, the method 800 generates a report that identifies the flagged at least one of the one or more statements, as shown at block 822.

In addition to all of the embodiments discussed hereinabove, the following embodiments may occur alone, together, or in any combination with the previously described embodiments.

Further embodiments may, based on parsing source code, identify a portion of the source code that specifies a deletion and subsequent recreation of a stored procedure, inline table-value function, scalar-valued function, and/or table-valued function. In such an embodiment, the report may specify that this portion of source code may be replaced with a CREATE statement that creates a place holder and a subsequent ALTER PROCEDURE statement.

In another embodiment, based on parsing source code, a portion of source code is identified when the portion of source code includes an INSERT statement but the INSERT statement does not specify a field (i.e., the statement lacks the field identifier) to be inserted. In such an embodiment, the portion of source code is flagged as containing an unqualified insert error, and the flagged portion of the source code and error are included in the report that is generated.

In an embodiment, based on parsing source code, a portion of source code is identified when that portion of source code uses an asterisk (*) as a wildcard within a SELECT clause. In such an embodiment, the portion of source code is flagged as containing an error, and the flagged portion of the source code and error are included in the report that is generated.

In an embodiment, based on parsing source code, a portion of source code is identified when that portion of source code uses a CREATE or ALTER statement that references a stored procedure without referencing a "dbo" schema. In such an embodiment, the portion of source code is flagged as containing an error, and the flagged portion of the source code and error are included in the report that is generated.

In an embodiment, based on parsing source code, a portion of source code is identified when that portion of source code references a stored procedure or function but fails to set a NOCOUNT parameter for the stored procedure or function. In such an embodiment, the portion of source code is flagged as un-optimized and performance degrading, and the flagged portion of the source code is included in the report that is generated.

In an embodiment, based on parsing source code, a portion of source code is identified when that portion of source code defines a variable but the variable is not referenced in relation to a stored procedure. In such an embodiment, the portion of source code is flagged as containing an error, and the flagged portion of the source code is included in the report that is generated.

In one embodiment, based on parsing source code, a portion of source code is identified when that portion of source code defines a parameter but the parameter is not referenced in relation to a stored procedure. In such an embodiment, the portion of source code is flagged as containing an error, and the flagged portion of the source code is included in the report that is generated.

In another embodiment, based on parsing source code, a portion of source code is identified when that portion of source code provides a deprecated syntax error. In such an embodiment, the portion of source code is flagged as containing a deprecated (e.g., obsolete) syntax error, and the flagged portion of the source code is included in the report that is generated. In further embodiments, a portion of source code is identified where the portion is unsupported by a particular version, for example, such as SQL Server 2008.

In another embodiment, based on parsing source code, a portion of source code is identified when that portion of source code recites a NOLOCK table hint. In such an embodiment, the portion of source code is flagged as un-optimized and performance degrading, and the flagged portion of the source code is included in the report that is generated.

In another embodiment, based on parsing source code, a portion of source code is identified when that portion of source code recites a SET ROWCOUNT command. In such an embodiment, the portion of source code is flagged as un-optimized and performance degrading, and the flagged portion of the source code is included in the report that is generated. In further embodiments, the report provides an instruction to replace the source code with a SELECT/TOP statement combination.

In one embodiment, based on parsing source code, a portion of source code is identified when that portion of source code contains a PRINT statement within a stored procedure. In such an embodiment, the portion of source code is flagged as containing an error, and the flagged portion of the source code is included in the report that is generated. In further embodiments, the report provides an instruction to remove the PRINT statement.

In an embodiment, based on parsing source code, a portion of source code is identified when that portion of source code recites a SELECT clause and the values in the SELECT clause do not align with the load_hint definition. In such an embodiment, the portion of source code is flagged as containing a load_hint mismatch error, and the flagged portion of the source code is included in the report that is generated.

In an embodiment, based on parsing source code, a portion of source code is identified when that portion of source code recites an HFCID (e.g., see FIG. 6 for an example comprising an HFCID) within a load_hint definition but the HFCID does not exist in the ItemTable. In such an embodiment, the portion of source code is flagged as containing a load_hint ItemTable missing error, and the flagged portion of the source code is included in the report that is generated.

In an embodiment, based on parsing source code, a portion of source code is identified when that portion of source code recites load_hint insertion in Arc_Loadhint-Cache within a stored procedure. In this example, when a load_hint insertion is found within the Arc_LoadhintCache, the load_hint may be erroneously executed at runtime, instead of being executed as part of the installation of the ORM application. In such an embodiment, the portion of source code is flagged as containing a load_hint error, and the flagged portion of the source code is included in the report that is generated.

In one embodiment, the report that is generated is stored as a first report, including the flagged portions of source code. Subsequently, methods herein may be performed on updated source code and a second report may be generated. The first report and the second report may be compared to one another, to determine one or more differences in flagged portions of source code, for example. In such embodiments, the comparison of the reports may be used to determine and confirm compatibility with the SQL Server programming language.

In an embodiment, based on parsing source code, a portion of source code is identified when that portion of source code comprises as statement for comparing two data types that may not be accurately and directly compared. In such an embodiment, the portion of source code is flagged as containing a precision loss error, and the flagged portion of the source code is included in the report that is generated.

In an embodiment, based on parsing source code, a portion of source code is identified when that portion of source code contains a literal null in SELECT clause. In such an embodiment, the portion of source code is flagged with a warning, and the flagged portion of the source code is included in the report that is generated.

In another embodiment, based on parsing source code, a portion of source code is identified when that portion of source code references a table without also referencing the IsDeleted field in that table. In such an embodiment, the portion of source code is flagged with a warning, and the flagged portion of the source code is included in the report that is generated.

In one embodiment, based on parsing source code, a portion of source code is identified when that portion of source code recites an IsDeleted field within a SELECT clause. In such an embodiment, the portion of source code may not be flagged, and a warning may be suppressed.

In yet another embodiment, based on parsing source code, a portion of source code is identified when that portion of source code includes a statement for locating the enterprise HCU without including a check as to whether the enterprise HCU is active. Specifically, the source code may include SELECT from the HCU table combined with or adjacent to a WHERE clause, but the source code fails to further recite AND Active=1, for example. In such an embodiment, the portion of source code is flagged with a warning, and the flagged portion of the source code is included in the report that is generated.

In one embodiment, based on parsing source code, a portion of source code is identified when that portion of source code uses t1, t2, to as tables' aliases. In such an embodiment, the portion of source code is flagged with a meaningless alias warning, and the flagged portion of the source code is included in the report that is generated.

In an embodiment, based on parsing source code, a portion of source code is identified when that portion of source code includes a SELECT statement and a TOP command without including an OrderBy command. In such an embodiment, the portion of source code is flagged with a warning, and the flagged portion of the source code is included in the report that is generated.

In an embodiment, based on parsing source code, a portion of source code is identified when that portion of source code includes a SELECT clause that does not include an OrderBy clause. Without an OrderBy clause, the records returned may generally lack an order or sequence. In such an embodiment, the portion of source code is flagged with a warning, and the flagged portion of the source code is included in the report that is generated.

In an embodiment, based on parsing source code, a portion of source code is identified when that portion of source code includes an UPDATE clause that assigns a value to LastCngDtime that is not getutcdate( ). In such an embodiment, the portion of source code is flagged with a warning, and the flagged portion of the source code is included in the report that is generated.

In one embodiment, based on parsing source code, a portion of source code is identified when that portion of source code contains an ANSI-89 value instead of an ANSI-92 value. The use of ANSI-89 may produce an undesirable Cartesian product. In such an embodiment, the portion of source code is flagged with a warning, and the flagged portion of the source code is included in the report that is generated.

In another embodiment, based on parsing source code, a portion of source code is identified when that portion of source code references Arc_sp_Semaphore_GetNextID, as this can cause blocking in some transactions at the database level. In such an embodiment, the portion of source code is flagged with a warning, and the flagged portion of the source code is included in the report that is generated. Further, the report may provide an instruction to replace Arc_sp_Semaphore_GetNextID with "oids" generated by a sequence generator instead.

In another embodiment, based on parsing source code, a portion of source code is identified when that portion of source code includes a syntax error such as converting one symbol to another symbol. In such an embodiment, these syntax errors are often introduced automatically by computerized auto-correct features (e.g., a single straight apostrophe ' is morphed to curved apostrophes "or a curly quote""). In such an embodiment, the portion of source code is flagged with a warning, and the flagged portion of the source code is included in the report that is generated.

In yet another embodiment, based on parsing source code, a portion of source code is identified when that source code provides a first input to a temp table that logs at the record (row) level. In such an embodiment, the portion of source code is flagged as un-optimized and performance degrading, and the flagged portion of the source code is included in the report that is generated. The report may specify that the portion of source code may be re-written to minimally log, at the page level, a first input to a table that is defined using the SELECT clause.

In one embodiment, based on parsing source code, a portion of source code is identified when the portion of source code contains dynamic SQL code. In such an embodiment, the portion of source code is flagged as un-optimized and performance degrading, and the flagged portion of the source code is included in the report that is generated. Instead, the report may indicate that the portion of source code should be replaced with straight SQL code or parameterized SQL code.

In another embodiment, based on parsing source code, a portion of source code is identified when the portion of source code contains a cursor loop or a while loop that may trigger a warning. In such an embodiment, the portion of source code is flagged as un-optimized and performance degrading. Further, the flagged portion of the source code is included in the report that is generated. The report may specify that the flagged portion of source code may be re-written to use set operations, for example, wherein the set operations are not expected to trigger the warning.

In another embodiment, based on parsing source code, a portion of source code is identified when the portion of source code comprises a top 1 subquery for locating a most relevant row in a table, for a JOIN clause or for a SELECT clause. In such an embodiment, the portion of source code is flagged as un-optimized and performance degrading. Further, the flagged portion of the source code is included in the report that is generated. The report may specify that the flagged portion of source code may be replaced using an apply operator, for example.

In another embodiment, based on parsing source code, a portion of source code is identified when the portion of source code comprises an ISNULL clause for a column that may be made null. In such an embodiment, the portion of source code is flagged as un-optimized and performance degrading. Further, the flagged portion of the source code is included in the report that is generated. The report may specify that the flagged portion of source code may be re-written to omit the ISNULL clause, for example.

In an embodiment, based on parsing source code, a portion of source code is identified when the portion of source code contains one or more clauses that drop a temporary table, that alter a temporary table, that truncate a temporary table, or that create an index of an existing temporary table. In such an embodiment, the portion of source code is flagged as predicted to be performance degrading. In embodiments, the portion of source code is flagged with a warning, and the flagged portion of the source code is included in the report that is generated.

In an embodiment, based on parsing source code, a portion of source code is identified when the portion of source code contains a statement that combines the MERGE clause with a NOT MATCHED BY SOURCE clause. In such an embodiment, the portion of source code is flagged as predicted to be performance degrading, as the combination of the clauses may be predicted to cause a server to scan and read every row within a table, in embodiments. The flagged portion of the source code may be included in the report that is generated, in some embodiments. Further, in some embodiments, the report may indicate that the portion of source code should be replaced with new SQL code.

Figure 9:
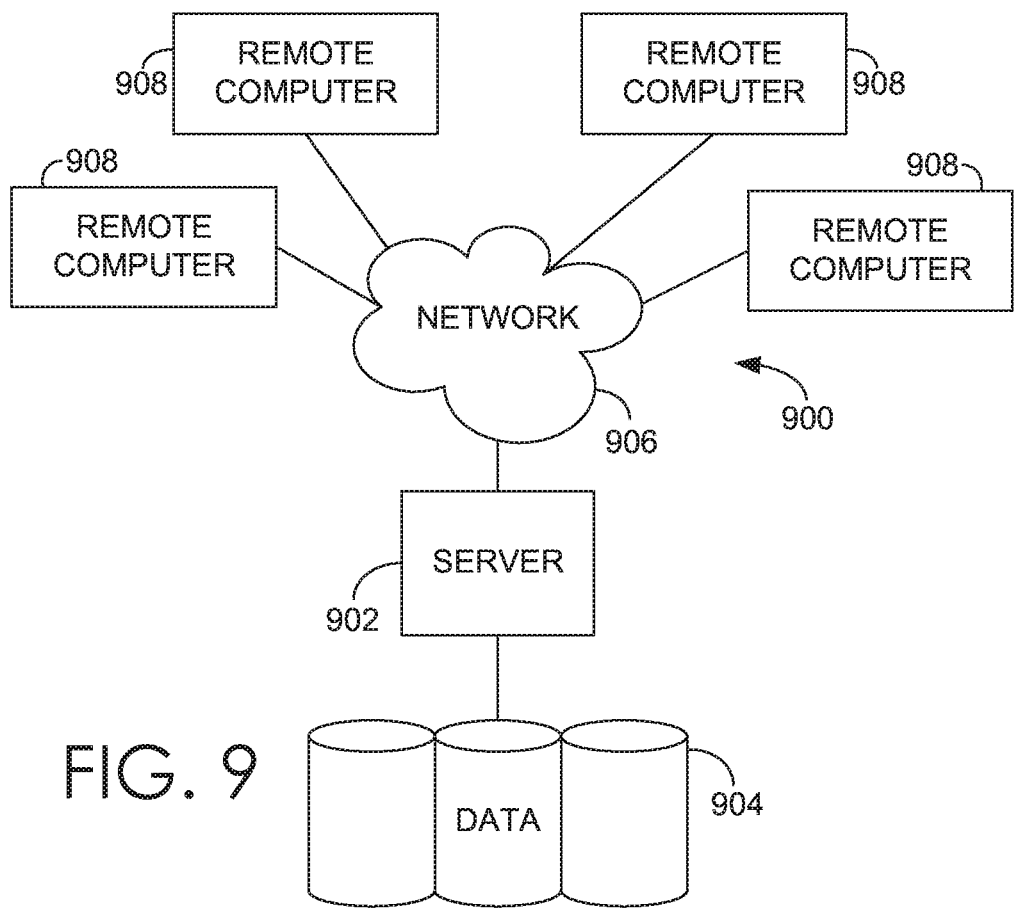
FIG. 9 depicts a block diagram of an example environment suitable to implement embodiments.

Turning to FIG. 9, it depicts a block diagram of an exemplary environment suitable to implement embodiments of the present invention. The exemplary computing environment 900 is suitable to implement embodiments of the present invention. It will be understood by those of ordinary skill in the art that the exemplary computing environment 900 is just one example of a suitable computing environment and is not intended to limit the scope of use or functionality of the present invention. Similarly, the exemplary computing environment 900 should not be interpreted as imputing any dependency and/or any requirements with regard to each component and combination(s) of components illustrated in FIG. 9. It will be appreciated by those having ordinary skill in the art that the connections illustrated in FIG. 9 are also exemplary as other methods, hardware, software, and devices for establishing a communications link between the components, devices, systems, and entities, as shown in FIG. 9, may be utilized in implementation of the present invention. Although the connections are depicted using one or more solid lines, it will be understood by those having ordinary skill in the art that the exemplary connections of FIG. 9 may be hardwired or wireless, and may use intermediary components that have been omitted or not included in FIG. 9 for simplicity's sake. As such, the absence of components from FIG. 9 should be not be interpreted as limiting the present invention to exclude additional components and combination(s) of components. Moreover, although devices and components are represented in FIG. 9 as singular devices and components, it will be appreciated that some embodiments may include a plurality of the devices and components such that FIG. 9 should not be considered as limiting the number of a devices or components.

Continuing, the exemplary computing environment 900 of FIG. 9 is illustrated as being a distributed environment where components and devices may be remote from one another and may perform separate tasks. The components and devices may communicate with one another and may be linked to each other using a network 906. The network 906 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 906, generally, provides the components and devices access to the Internet and web-based applications.

The exemplary computing environment 900 comprises a computing device in the form of a server 902. In one embodiment, the server 902 is a SQL server. Although illustrated as one component in FIG. 9, the present invention may utilize a plurality of local servers and/or remote servers in the exemplary computing environment 900. The server 902 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 902 may include or may have access to computer-readable media. Computer-readable media can be any available media that may be accessed by server 902, and includes volatile and nonvolatile media, as well as removable and non-removable media. By way of example, and not limitation, computer-readable media may include computer storage media and communication media. Computer storage media may include, without limitation, volatile and non-volatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 902. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the server 902 uses logical connections to communicate with one or more remote computers 908 within the exemplary computing environment 900. In one embodiment, the one or more remote computers 908 comprise external computer systems that leverage object-oriented programming. In embodiments where the network 906 includes a wireless network, the server 902 may employ a modem to establish communications with the Internet, the server 902 may connect to the Internet using Wi-Fi or wireless access points, or the server 902 may use a wireless network adapter to access the Internet. The server 902 engages in two-way communication with any or all of the components and devices illustrated in FIG. 9, using the network 906. Accordingly, the server 902 may send data to and receive data from the remote computers 908 over the network 906.

Although illustrated as a single device, the remote computers 908 may include multiple computing devices. In an embodiment having a distributed network, the remote computers 908 may be located at one or more different geographic locations. In an embodiment where the remote computers 908 are a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some embodiments, the remote computers 908 are physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other embodiments, the remote computers 908 may be physically located in a non-medical setting, such as a packing and shipping facility or deployed within a fleet of delivery or courier vehicles.

Continuing, the exemplary computing environment 900 includes a database 904. In one embodiment, the database 904 comprises a SQL database. In some embodiments, the database 904 and at least the server 902, together, form an RDBMS. Although shown as a single component, the database 904 may be implemented using multiple data stores that are communicatively coupled to one another, independent of the geographic or physical location of a memory device. Exemplary data stores may also store data in the form of electronic records, for example, electronic medical records of patients, transaction records, billing records, task and workflow records, chronological event records, and the like.

Generally, the database 904 includes physical memory that is configured to store information encoded in data. For example, the database 904 may provide storage for computer-readable instructions, computer-executable instructions, data structures, data arrays, computer programs, applications, and other data that supports the functions and action to be undertaken using the exemplary computing environment 900 and components shown in exemplary FIG. 9.

In a computing environment having distributed components that are communicatively coupled via the network 906, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular data types. In embodiments, the server 902 may access, retrieve, communicate, receive, and update information stored in the database 904, including program modules. Accordingly, the server 902 may execute, using a processor, computer instructions stored in the database 904 in order to perform embodiments described herein.

Although internal components of the devices in FIG. 9, such as the server 902, are not illustrated, those of ordinary skill in the art will appreciate that internal components and their interconnection are present in the devices of FIG. 9. Accordingly, additional details concerning the internal construction of the device are not further disclosed herein.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. One or more non-transitory computer-readable media having executable instructions embodied thereon that, when executed by a processor of a computing device, perform a method, the method comprising:
   parsing source code stored in a database comprising tables;
   identifying a portion of the source code that is predicted to cast data stored in the tables as a first data type to a second data type that is different than the first data type;
   determining that to cast data stored in the tables as a first data type to a second data type corresponds to a problematic casting operation;
   flagging the portion of the source code based on determining that to cast the data stored in the tables as the first data type to the second data type corresponds to the problematic casting operation; and
   generating a report that identifies the flagged portion of the source code and a location of the flagged portion of the source code, wherein the report identifies that the flagged portion of the source is predicted to generate one or more of an error, a warning, or impaired server performance.

2. The media of claim 1, further comprising:
   determining that the first data type is a string-based data type;
   determining that the second data type is an integer-based data type; and
   wherein determining that to cast the data from the first data type that is the string-based data type to the second data type that is the integer-based data type is predicted to reduce performance of a server.

3. The media of claim 1, further comprising:
   determining that the first data type is a first string-based data type;
   determining that the second data type is a second string-based data type; and
   wherein determining that to cast the data from the first string-based data type to the second string-based data type is predicted to reduce performance of a server.

4. The media of claim 1, further comprising:
   determining that the first data type is a first integer-based data type;
   determining that the second data type is a second integer-based data type; and
   wherein determining that to cast the data from the first integer-based data type to the second integer-based data type is predicted to reduce performance of a server.

5. The media of claim 1, wherein identifying the portion of the source code that is predicted to cast the data stored in the tables as the first data type to the second data type that is different than the first data type comprises:
   determining that the portion of the source code comprises one or more of a WHERE clause or a JOIN clause.

6. The media of claim 1, further comprising:
   identifying metadata associated with the tables, wherein the metadata identifies one or more schemas of the tables, and wherein the one or more schemas identify one or more of the first data type or the second data type.

7. The media of claim 6, further comprising:
   determining that the portion of the source code comprises a parameter, wherein the parameter is identified as corresponding to the first data type.

8. The media of claim 6, further comprising:
   determining that the portion of the source code comprises one or more of a WHERE clause or a JOIN clause;
   determining that the one or more of a WHERE clause or a JOIN clause identifies a particular table of the tables in the database;
   identifying metadata associated with the particular table, wherein the metadata describes a second schema of the one or more schemas, wherein the second schema identifies the second data type; and
   identifying that the particular table corresponds to the second data type based on the second schema.

9. The media of claim 1, further comprising:
parsing the source code stored in the database;
identifying the portion of the source code comprising one or more of a deprecated syntax error or a load_hint insertion within an Arc_LoadhintCache; and
flagging the portion of the source code, wherein the report identifies the flagged portion of the source code.

10. The media of claim 1, further comprising:
subsequently parsing additional source code;
identifying and flagging a new portion of the additional source code;
generating an additional report that identifies the flagged new portion of the additional source code; and
identifying one or more differences between the flagged new portion of the additional report and the previously-generated report.

11. One or more non-transitory computer-readable media having executable instructions embodied thereon that, when executed by a processor of a computer device, perform a method, the method comprising:
referencing source code stored in a database, the source code comprising objects, mapping strings, and tables, the tables comprising fields, wherein the mapping strings and the tables are encoded in different programming languages;
parsing each of the mapping strings in order to identify one or more of the objects and one or more of the fields within each mapping string;
for each of the parsed mapping strings:
identifying that the parsed mapping string maps the one or more of the objects to the one or more of the fields in the tables;
parsing one or more of the tables having the one or more of the fields identified in the parsed mapping string; and
determining whether the one or more parsed tables are an intended table for the one or more of the fields identified in the parsed mapping string; and
when one or more of the parsed tables are determined not to be an intended table for the one or more fields identified, generating a report that identifies the one or more parsed tables and that identifies the one or more parsed tables are predicted to generate one or more of an error, a warning, or impaired server performance.

12. The media of claim 11, wherein determining whether the one or more parsed tables are the intended table comprises:
determining when an identifier of the one or more of the fields identified in the mapping string matches an identifier of at least one field in the one or more parsed tables.

13. The media of claim 11, further comprising:
determining when a total number of the one or more of the fields identified in the parsed mapping string matches a total number of the one or more of the fields in the parsed table.

14. The media of claim 11, wherein determining whether the one or more parsed tables are the intended table comprises:
determining that an identifier of the one or more of the fields identified within the parsed mapping string matches an identifier of the one or more of the fields in the parsed table.

15. The media of claim 14, further comprising determining that a placement of the one or more of the fields within the parsed mapping string matches a placement of the one or more of the fields in the parsed table that are determined to have matching identifiers, wherein the one or more parsed tables are determined to be an intended table for the one or more of the fields identified in the parsed mapping string.

16. The media of claim 14, further comprising determining that a placement of the one or more of the fields within the parsed mapping string does not match a placement of the one or more of the fields in the parsed table that are determined to have matching identifiers, wherein the one or more parsed tables are determined not to be an intended table for the one or more of the fields identified in the parsed mapping string.

17. The media of claim 11, wherein the parsed mapping string is a comma delimited list that specifies one or more relationships between: the one or more objects, the one or more fields, or the one or more of the objects and the one or more of the fields.

18. The media of claim 11, wherein the method is iteratively performed to parse the source code line-by-line.

19. The media of claim 11, wherein the report identifies the one or more tables that are determined not to be intended sources, identifies the mapping strings that incorrectly map to the one or more tables that are determined not to be intended sources, and identifies the one or more fields within the mapping strings that incorrectly map to the one or more tables that are determined not to be intended sources.

20. One or more non-transitory computer-readable media having executable instructions embodied thereon that, when executed by a processor of a computer device, perform a method, the method comprising:
parsing source code stored in a structured query language (SQL) database, the source code comprising mapping strings and tables, the tables comprising fields;
identifying one or more statements in the source code;
identifying that at least one of the one or more statements comprise a mapping string of one or more objects and one or more of the fields;
identifying that the at least one mapping string maps the one or more objects to the one or more tables;
parsing one or more of the tables in the database, the one or more tables comprising the one or more fields identified in the at least one mapping string;
determining whether the one or more tables are the intended table for the one or more fields identified in the at least one mapping string;
flagging the at least one of the one or more statements when the one or more tables are determined not to be the intended table;
identifying whether the at least one of the one or more statements is predicted to cast data stored in the one or more tables from a first data type to a second data type that is different;
when the at least one of the one or more statements is predicted to cast data stored in the one or more tables from the first data type to the second data type that is different, determining whether to cast the data stored in the tables as the first data type to the second data type is a problematic casting operation;
flagging the at least one of the one or more statements when to cast the data stored in the tables as the first data type to the second data type is determined to be the problematic casting operation; and generating a report identifying the at least one of the one or more statements that is flagged, wherein the report specifies whether the flagged portion of the source is predicted to generate one or more of an error, a warning, or impaired server performance.

* * * * *

UNITED STATES PATENT AND TRADEMARK OFFICE
CERTIFICATE OF CORRECTION

| | | |
|---|---|---|
| PATENT NO. | : 11,036,497 B1 | Page 1 of 1 |
| APPLICATION NO. | : 16/654206 | |
| DATED | : June 15, 2021 | |
| INVENTOR(S) | : Eric Christopher Winemiller et al. | |

It is certified that error appears in the above-identified patent and that said Letters Patent is hereby corrected as shown below:

In the Specification

Column 04, Line 56: Delete "()" and insert -- ( ), --.

Column 13, Line 39: Delete "load hint" and insert -- load_hint --.

Column 13, Line 41: Delete "Enter ed" and insert -- Entered --.

Column 14, Line 67: Delete ""defineloadhintforhfc.StaffDescription;" and insert
-- define load_hint for
hfc.Staff{Description; --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*